Nov. 14, 1950  E. T. BJORKLUND ET AL  2,530,148
COLLAPSIBLE CAGE OR LIVE BOX
Filed April 19, 1947  2 Sheets-Sheet 1

INVENTORS
CARL S. BJORKLUND
EDSEL T. BJORKLUND
EDGAR C. BJORKLUND

ATTORNEYS

Nov. 14, 1950     E. T. BJORKLUND ET AL     2,530,148
COLLAPSIBLE CAGE OR LIVE BOX
Filed April 19, 1947     2 Sheets-Sheet 2
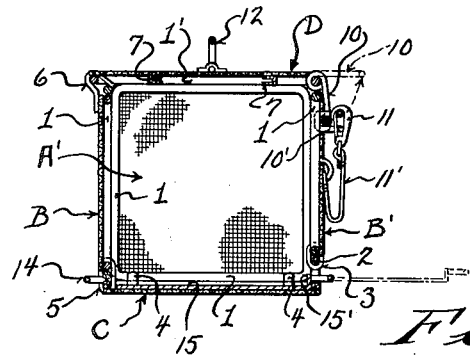
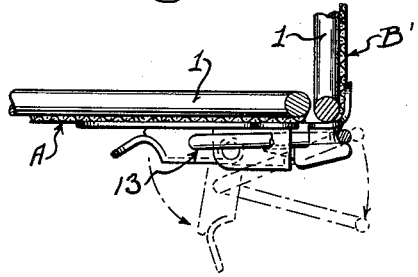
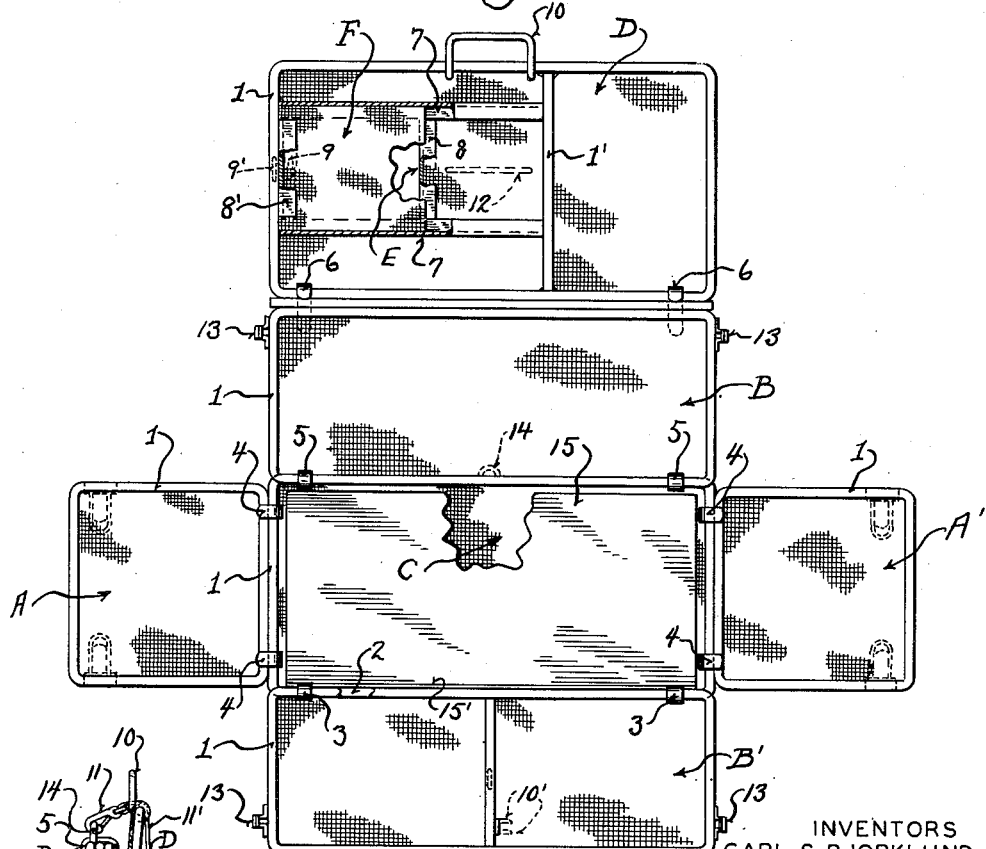
INVENTORS
CARL S. BJORKLUND
EDSEL T. BJORKLUND
EDGAR C. BJORKLUND
BY
ATTORNEYS Patented Nov. 14, 1950

2,530,148

UNITED STATES PATENT OFFICE 2,530,148

COLLAPSIBLE CAGE OR LIVE BOX

Edsel T. Bjorklund, Edgar C. Bjorklund, and Carl S. Bjorklund, Milwaukee, Wis.

Application April 19, 1947, Serial No. 742,538

1 Claim. (Cl. 119—17)

Our invention refers to cages or live boxes for fish and bait or the like, and it has for its primary object to provide a simple, durable, collapsible, ventilated, metal cage for transporting or shipping live animals or birds and also for submerging as a live box for bait, it being understood that said cage may be manufactured in various sizes.

The specific object of our invention is to provide a plurality of panel units having wire frames provided with bottom hinges connected by clasps and a hinge cover with a slidable covered hand hole. The finished unit is collapsible and with provision for a solid slidable sheet metal bottom in conjunction with a perforated bottom frame for sanitary purposes in shipping animals.

It is also manifest that when the box is fully collapsed or folded one panel upon the other and locked together, the unit may be conveniently carried or shipped in a compact and minimum space.

With the above and other objects in view, which will appear as the description proceeds, the invention resides in the novel construction, combination and arrangement of parts, substantially as hereinafter described, and more particularly defined by the appended claims, it being understood that such changes in the precise embodiment of the herein disclosed invention may be made as come within the scope of the claims.

In the accompanying drawings is illustrated one complete example of the physical embodiment of the present invention constructed according to the best mode so far devised for the practical application of the principles thereof.

In the drawings:

Figure 4 is another cross section of the cage, the section being indicated by line 4—4 of Figure 2.

Figure 5 is an enlarged fragmentary view, illustrating a sectional corner of the cage, showing our preferred form of corner clasp, the section being indicated by line 5—5 of Figure 1.

Figure 6 is a plan view of the cage folded outwardly upon a flat plain preparatory to being compactly nested for shipment.

Figure 7 is an end view of the cage with its panels in its compactly folded position and locked together.

Referring by characters to the drawings A and A' indicate the ventilated end panels, B and B', the side panels, C the bottom panel and D the hinged top cover.

All of the panels, as shown, comprise woven wire sheets reinforced by rectangular wire rod frames 1, to which frames are welded, or otherwise secured, the wire meshed sheets for reinforcing purposes. The front stretch of the bottom frame has secured thereto a reinforcing rod 2, spaced above and paralleling said bottom stretch 1 to form a mouth or gap.

Figure 1:
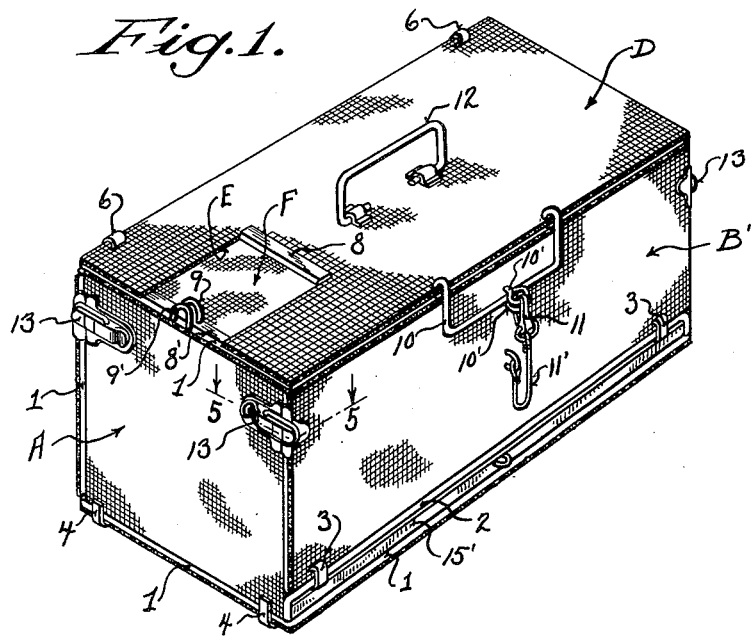
Figure 1 is a perpective view of a cage embodying the features of our invention.

As best illustrated in Figure 1 of the drawings, the bottom stretch of the front panel frame B' carries loops 3 for hinged engagement with the rod 2.

The side stretches of the bottom frame 1 are pivotally connected to the bottom stretches of the end frames A and A' by loops 4—4 extending from the end panel frames.

The lower stretch of the frame of the rear panel B is also pivotally connected to a stretch of the bottom frame 1 by loops 5—5 carried by the rear panel. Hence, as best shown in Figure 6 of the drawings, the side and end panels are pivotally connected to the bottom panel.

The upper stretch of frame 1 of the back panel B is provided with loops 6—6 for hinged engagement with the back stretch of the frame forming part of the panel D, whereby said cover panel D may readily be opened or closed.

The wire frame of the panel cover D has secured thereto a cross brace wire 1', to which is attached the inner ends of parallel strips 7—7, the opposite end of said parallel strips being welded to the end stretch of the wire frame 1, as shown.

A flat strip 8 is transversely connected to the parallel strips 7 and between this flat strip 8 and a similar strip 8', connected to the frame 1, is a hand opening E for convenience in access to the body of the box for the purpose of extracting or depositing the fish or bait. A slidable meshed wire shutter F is mounted in the channel strips 7, whereby the opening is closed, said shutter F may be secured by staples 9 and 9' associated with the cover and strip 8'.

As best indicated in Figure 1 of the drawings, the front edge of the swinging cover D has pivotally mounted thereon a hand link 10 adapted to engage between a pair of eyes 10' extending from the side front panel B', whereby said cover may be securely fastened and locked by a spring snap 11, firmly secured to said panel by a flexible runner 11' as shown. It is understood that the swinging cover D is also provided with a manipulating handle 12 intermediate its ends.

When the side and end panels are brought together to form the box, the upper corners are secured by a standard link and latch 13, there being similar latches on all upper corners and the same are purchased in open market known as "suit case latches."

While we have shown and described all of the panels wherein wire meshed sheets are employed, it is apparent that in some instances, we may employ, for example, solid sheets of metal as a substitute for the meshed wire, under which conditions two of the panels may be perforated for ventilation. We may also, under certain conditions, fabricate the panels from what is known as "Metal Mesh," developed by stamping said sheets to render them porous.

Figure 2:
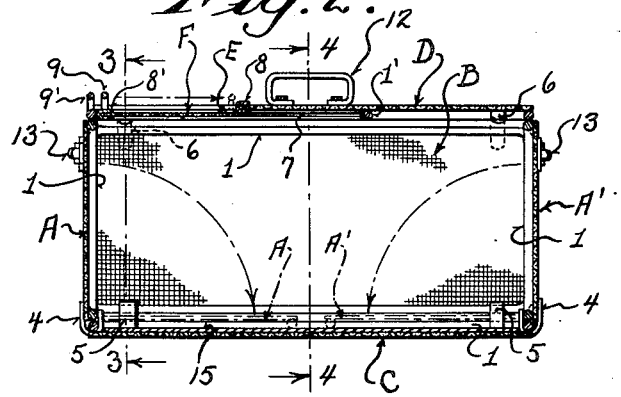
Figure 2 is a longitudinal, sectional view of the same, the section being indicated by line 2—2 of Figure 3.
Figure 3:
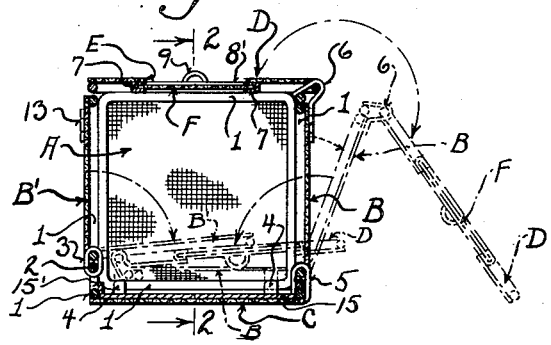
Figure 3 is a cross section of the cage, the section being indicated by line 3—3 of Figure 2.

Referring now to Figures 6 and 7 of the drawings and also Figures 2 and 3 of the same, when it is desired to knock down or totally collapse the box, the corner latches 13 are disconnected, as well as the hand link 10. Thereafter, all of the panels are folded outwardly upon a flat plain as indicated in Figure 6 of the drawings, and thereafter, as indicated in dotted lines Figure 2, the end panels are first folded down. The rear panel B, as indicated in dotted lines Figure 3, is then swung downwardly, and the cover panel D is folded upon the back panel B, whereby both of said panels are then folded flat upon the two side panels and thereafter, the front panel B' is folded thereon.

In this collapsed position, the panels are locked together by the spring snap 11 in conjunction with its runner 11', the said spring snap being engaged with a staple 14 extending from the juxtaposed sides of the frames 1 of the back panel B.

When it is desired, for sanitary purposes, to provide a solid false bottom for the cage, a solid metal sheet 15, having an upturned front edge 15', is inserted, and upon the bottom of the cage through the narrow throat or slot formed by the rod 2 and frame wire member 1, the said sheet 15 being provided with an upturned flange 15' which closes the gap between the aforesaid frame members.

Thus, all trash and foreign matter is retained in the cage when used in transportation of live animals, birds and the like.

We claim:

A live box having a bottom panel comprising a rectangular screened sheet, a rod binder therefor, a reinforcing offset rod extending from and paralleling one stretch of the rod binder to form a slotted mouth having a false solid bottom sheet slidable therein, the solid sheet being provided with an upturned lip adapted to close the mouth, other similar side and end panels having rod binders in hinge connection with three sides of the bottom rod binders, another similar panel being in hinged connection with the offset reinforcing rod of the bottom panel, clips for locking the sides and end panels together and a cover panel in hinged connection with one of the side panels.

EDSEL T. BJORKLUND.
EDGAR C. BJORKLUND.
CARL S. BJORKLUND.

REFERENCES CITED

The following references are of record in the file of this patent:

UNITED STATES PATENTS

| Number | Name | Date |
| --- | --- | --- |
| 665,918 | Lisby | Jan. 15, 1901 |
| 923,725 | Sterrett | June 1, 1909 |
| 1,306,132 | Upton | June 10, 1919 |
| 1,771,492 | Karlson | July 29, 1930 |
| 1,973,952 | Goldberg | Sept. 18, 1934 |